US012631807B2

(12) United States Patent (10) Patent No.: US 12,631,807 B2

French et al. (45) Date of Patent: May 19, 2026

(54) COLOR FILTER MODULE

(71) Applicant: E Ink Holdings Inc., Hsinchu (TW)

(72) Inventors: Ian French, Hsinchu (TW); Po-Yuan Lo, Hsinchu (TW); Liang-Yu Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 564 days.

(21) Appl. No.: 17/575,613

(22) Filed: Jan. 13, 2022

(65) Prior Publication Data

US 2022/0299686 A1 Sep. 22, 2022

(30) Foreign Application Priority Data

Mar. 16, 2021 (TW) ................................. 110109258

(51) Int. Cl.
 *G02F 1/1335* (2006.01)
 *G02B 5/20* (2006.01)
 *G02F 1/167* (2019.01)
(52) U.S. Cl.
 CPC ............. *G02B 5/201* (2013.01); *G02F 1/167* (2013.01)
(58) Field of Classification Search
 CPC ............................... G02F 1/167; G02F 1/1335
 USPC .......................................... 349/106; 345/613
 See application file for complete search history.

(56) References Cited

U.S. PATENT DOCUMENTS

| | | | |
|---|---|---|---|
| 7,248,268 B2 * | 7/2007 | Brown Elliott .......... | H04N 1/58 |
| | | | 345/589 |
| 9,100,558 B2 | 8/2015 | Tanaka et al. | |

| | | | |
|---|---|---|---|
| 9,164,285 B2 * | 10/2015 | Whangbo .............. | G02B 30/27 |
| 9,250,121 B2 | 2/2016 | Tanaka et al. | |
| 9,355,601 B2 | 5/2016 | Brown Elliott | |
| 9,787,952 B2 | 10/2017 | Hsu et al. | |
| 10,777,114 B2 | 9/2020 | Moon et al. | |
| 2013/0128354 A1 | 5/2013 | Whangbo et al. | |

(Continued)

FOREIGN PATENT DOCUMENTS

| | | |
|---|---|---|
| CN | 105093600 A | 11/2015 |
| CN | 106371254 A | 2/2017 |

(Continued)

OTHER PUBLICATIONS

"Office Action of China Counterpart Application", issued on Jan. 21, 2025, p. 1-p. 7.

(Continued)

*Primary Examiner* — Audrey Y Chang
(74) *Attorney, Agent, or Firm* — JCIPRNET

(57) ABSTRACT

A color filter module is provided. The color filter module is disposed on an electrophoretic display panel. The color filter module includes a transparent substrate and a color resist layer. The transparent substrate includes a plurality of pixel regions arranged in an array. Each of the plurality of pixel regions includes a plurality of sub-pixel regions. The color resist layer is disposed on the transparent substrate. Among the plurality of sub-pixel regions of the transparent substrate, a first sub-pixel region and a second sub-pixel region that correspond to a same color and are adjacent to each other are provided with a plurality of color resist units of the same color of the color resist layer. The plurality of color resist units are arranged in an array and arranged in a discontinuous pattern.

6 Claims, 4 Drawing Sheets

(56)                    References Cited

U.S. PATENT DOCUMENTS

| | | | | |
|---|---|---|---|---|
| 2013/0161774 A1* | 6/2013 | Okigawa | .................. | G03B 3/10 |
| | | | | 257/432 |
| 2014/0362131 A1* | 12/2014 | Paolini, Jr. | ............. | G02F 1/167 |
| | | | | 345/697 |
| 2014/0375932 A1* | 12/2014 | Sekine | ................... | H04N 13/31 |
| | | | | 349/95 |
| 2015/0355522 A1* | 12/2015 | Lee | ......................... | G02F 1/167 |
| | | | | 359/296 |
| 2017/0254933 A1* | 9/2017 | Li | ......................... | H01L 33/504 |

FOREIGN PATENT DOCUMENTS

| | | |
|---|---|---|
| CN | 108333847 | 7/2018 |
| CN | 208367395 | 1/2019 |
| KR | 20090073903 | 7/2009 |
| KR | 20120017120 | 2/2012 |
| TW | 200718985 A | 5/2007 |
| TW | 201415152 | 4/2014 |

OTHER PUBLICATIONS

"Office Action of China Counterpart Application", issued on Jul. 4, 2025, p. 1-p. 6.
"Office action of China counterpart Application", issued on Dec. 4, 2025, p. 1-p. 6.

* cited by examiner

COLOR FILTER MODULE

CROSS-REFERENCE TO RELATED APPLICATION

This application claims the priority benefit of Taiwan application serial no. 110109258, filed on Mar. 16, 2021. The entirety of the above-mentioned patent application is hereby incorporated by reference herein and made a part of this specification.

BACKGROUND

Technical Field

The disclosure relates to a filter module, and particularly relates to a color filter module.

Description of Related Art

In electronic paper (e-paper) and electronic books (e-books), the purpose of display is achieved through the adoption of the electrophoretic display (EPD) technology. Taking an e-book displaying black and white colors as an example, a display medium of the electrophoretic display is mainly composed of the electrophoretic fluid and black and white charged particles mixed in the electrophoretic fluid. By applying a voltage, the black and white charged particles may be driven to move, so that each pixel may display a black color, a white color, or a gray scale individually.

In the related art, the electrophoretic displays adopt reflection of an external light source to achieve the purpose of display most of the time, and the black and white charged particles doped in the electrophoretic fluid may be driven by voltages to enable each pixel to display a required gray scale. Furthermore, in order to expand applications of the electrophoretic display, a color filter array (CFA) may also be provided on the electrophoretic display film. At this time, color presentation of the electrophoretic display is mainly implemented by penetration of the color filter array performed by the external light after being reflected by the charged particles in the electrophoretic fluid after the external light passes through the color filter array.

Generally, the color filter array is mainly composed of a plurality of filter patterns of different colors, and filter patterns of different colors may each correspondingly drive a pixel unit on an array substrate. The electrophoretic display uses the white charged particles and the black charged particles to absorb and reflect light, and the red, blue, and green filter patterns are used together to present a color display image.

When an existing reflective color electrophoretic display device displays a white pattern, an arrangement pattern of color resists may cause a grainy texture. In particular, along with increase of color saturation to be displayed, the length or the area of the color resist are also increased. As a result, the phenomenon of the grainy texture becomes more obvious. It should be noted that a decrease in the area of the arrangement pattern of the color resists may mitigate the problem of grainy texture. However, the color performance of a displayed color image may be lowered at the same time. Therefore, solutions are provided in the embodiments as follows.

SUMMARY

The disclosure is directed to a color filter module capable of mitigating a phenomenon of grainy texture of a white pattern without excessively lowering color performance of a color image.

The disclosure provides a color filter module disposed on an electrophoretic display panel. The color filter module includes a transparent substrate and a color resist layer. The transparent substrate includes a plurality of pixel regions arranged in an array. Each of the plurality of pixel regions includes a plurality of sub-pixel regions. The color resist layer is disposed on the transparent substrate. Among the plurality of sub-pixel regions of the transparent substrate, a first sub-pixel region and a second sub-pixel region that correspond to a same color and are adjacent to each other are provided with a plurality of color resist units of the same color of the color resist layer. The plurality of color resist units are arranged in an array and arranged in a discontinuous pattern.

Based on the above description, the color filter module of the disclosure is capable of mitigating the phenomenon of grainy texture of a white pattern without excessively lowering color performance of a color image.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
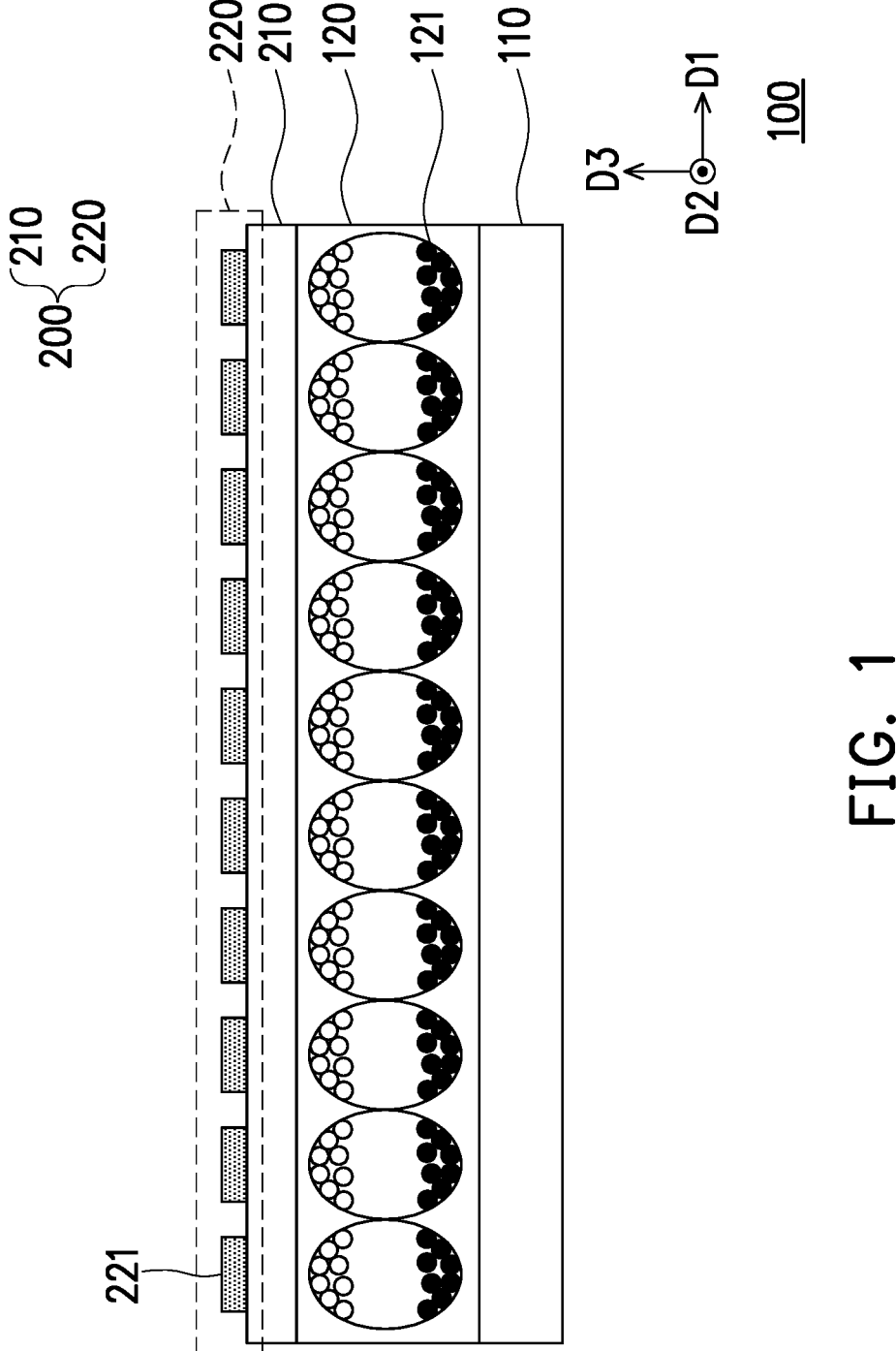
FIG. 1 is a local cross-sectional view illustrating an electrophoretic display device according to an embodiment of the disclosure.

Reference will now be made in detail to the present preferred embodiments of the disclosure, examples of which are illustrated in the accompanying drawings. Wherever possible, the components/members/steps using the same reference numbers are used in the drawings and the description to refer to the same or like parts.

Moreover, unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a local cross-sectional view illustrating an electrophoretic display device. For the convenience of description, some components are omitted in FIG. 1. Referring to 1, an electrophoretic display device 100 includes a display driving module 110, an electrophoretic display panel 120, and a color filter module 200. Moreover, the electrophoretic display panel 120 may be disposed on the display driving module 110 in a third direction D3. Furthermore, the color filter module 200 may be disposed on the electrophoretic display panel 120 in the third direction D3. In this embodiment, a color resist layer 220 is formed on a substrate 210. It should be noted that the color resist layer 220 may be disposed on the substrate 210 in the third direction D3, and the color resist layer includes a plurality of color resist units 221 arranged in an array in a first direction D1 and a second direction D2. For example, the color resist units 221 may include color resist units 221 of different colors such as red, green, and blue, but the disclosure is not limited thereto. In addition, the color resist units 221 may be arranged corresponding to an electrophoretic display um 121 and are arranged in a manner of, for example, one-to-one, many-to-one, one-to-many, or many-to-many, which is not limited by the disclosure. In this way, a display image of the electrophoretic display device 100 may display a corresponding color through the color filter module 200, and the electrophoretic display medium 121 may be driven by the display driving module 110 to adjust a brightness value.

In this embodiment, the display driving module 110 may include a thin-film transistor (TFT) array. In addition, the TFT array may include a plurality of top-gate TFTs or a plurality of bottom-gate TFTs, and the disclosure is not limited thereto. In this embodiment, the electrophoretic display panel 120 may include a reflective electrophoretic display panel, but the disclosure is not limited thereto. In this embodiment, the electrophoretic display panel 120 may include a plurality of electrophoretic display media 121, and each of the electrophoretic display media 121 may include an electrophoretic fluid, a plurality of white charged particles, and a plurality of black charged particles, but the disclosure is not limited thereto. In this embodiment, the color filter module 200 may include a color filter array (CFA), but the disclosure is not limited thereto. In this embodiment, the substrate 210 may be a transparent substrate. The substrate 210 may include a flexible substrate, and a material of the flexible substrate may include polyethylene terephthalate (PET), but the disclosure is not limited thereto. In this embodiment, the first direction D1, the second direction D2, and the third direction D3 are perpendicular to each other in pairs to form a three-dimensional coordinate system.

Figure 2:
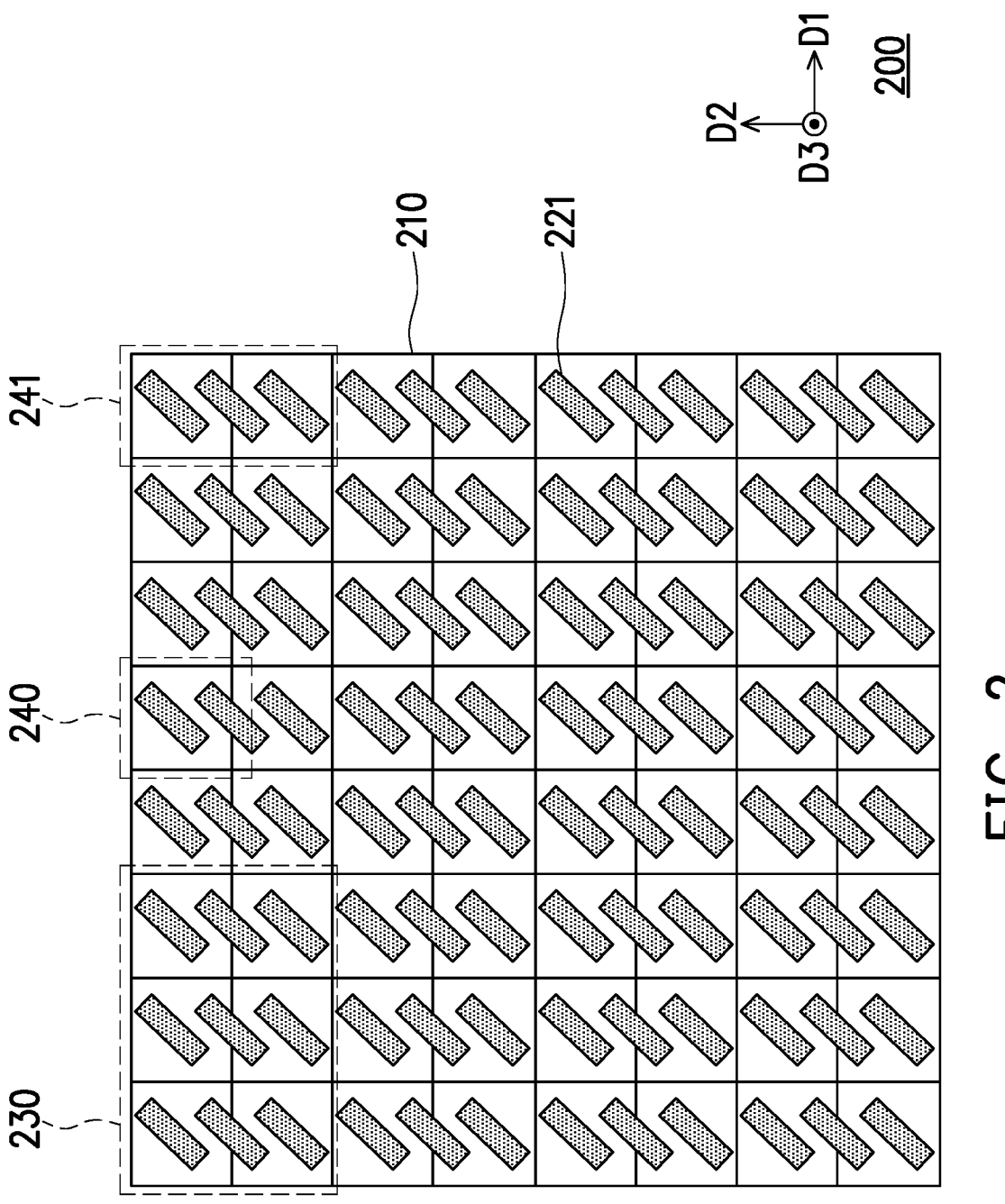
FIG. 2 is a top view illustrating a color filter module according to an embodiment of the disclosure.

FIG. 2 is a top view illustrating a color filter module. For the convenience of description, some components are omitted in FIG. 2. Referring to FIG. 2, the color filter module 200 may include the color resist layer 220 formed on the substrate 210. In this embodiment, the color resist layer 220 may be disposed on the substrate 210 in the third direction D3, and the color resist layer 220 includes a plurality of color resist units 221 arranged in an array in the first direction D1 and the second direction D2. In this embodiment, the substrate 210 may include a plurality of pixel regions 230, and each pixel region 230 may include a plurality of sub-pixel regions 240. In this embodiment, the sub-pixel regions 240 may construct one pixel region 230 in a manner of 2×3. In an embodiment, the sub-pixel regions 240 may construct one pixel region 230 in a manner of 1×3, 2×2, 3×3, etc., but the disclosure is not limited thereto. In this embodiment, each pixel region 230 may be provided with a plurality of color resist units 221 of different colors, such as red, green, and blue color resist units 221, but the disclosure is not limited thereto. In this embodiment, a plurality of color resist units 221 may be disposed on two continuous sub-pixel regions 240, and the two continuous sub-pixel regions 240 form one color sub-pixel region 241. In an embodiment, a plurality of color resist units 221 may be arranged on three continuous sub-pixel regions 240, and the three continuous sub-pixel regions 240 form one color sub-pixel region 241. The disclosure does not limit the number of the sub-pixel regions 240 in one color sub-pixel region 241. In addition, the sub-pixel regions 240 of FIG. 2 may be arranged corresponding to the electrophoretic display media 121 of FIG. 1 and are arranged in a manner of, for example, one-to-one, many-to-one, one-to-many, or many-to-many, but the disclosure is not limited thereto.

Figure 3B:
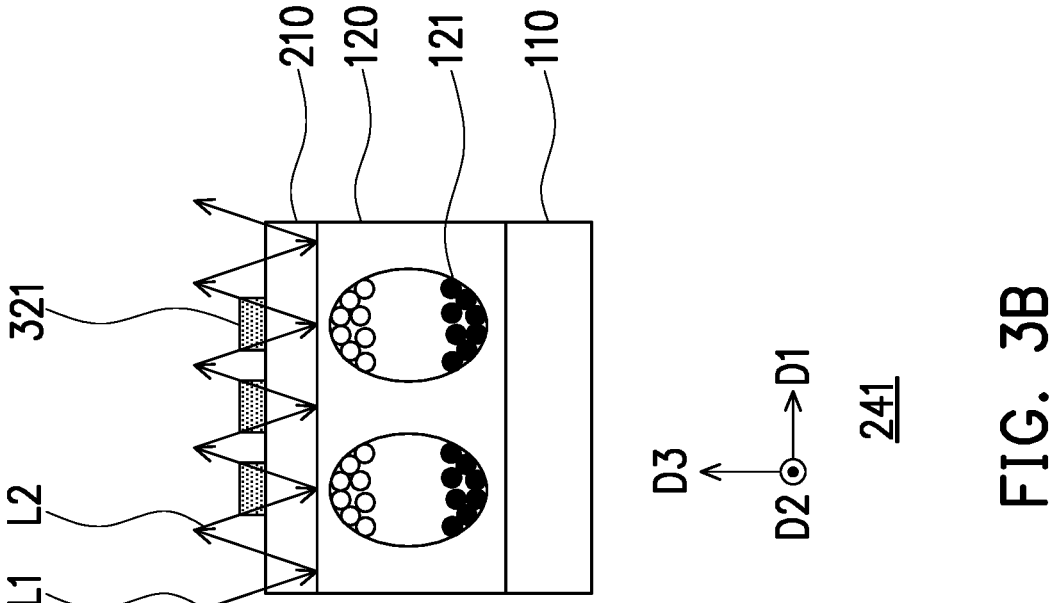
FIG. 3B is a local cross-sectional view illustrating the color sub-pixel region of FIG. 3A taken along a section line A-A' according to the disclosure.
Figure 3A:
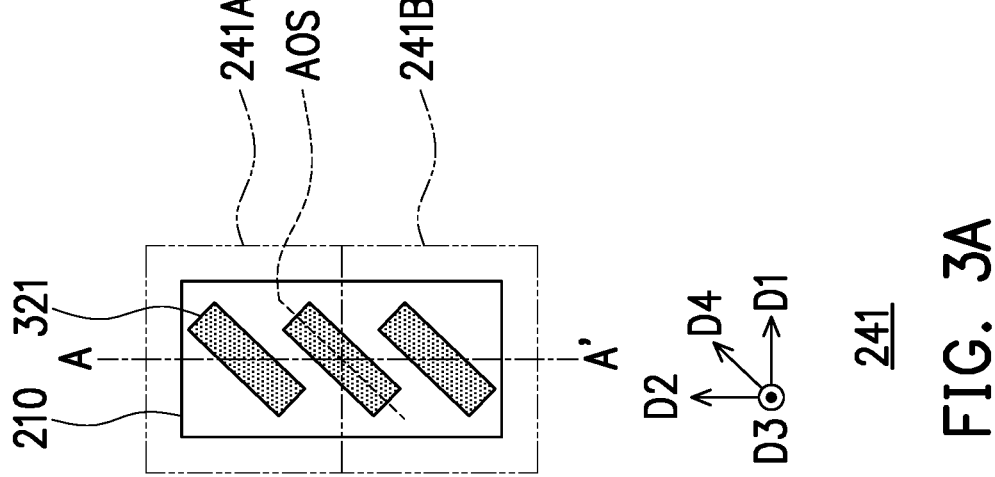
FIG. 3A is a top view illustrating a color sub-pixel region according to an embodiment of the disclosure.

FIG. 3A is a top view illustrating a color sub-pixel region according to an embodiment of the disclosure. FIG. 3B is a local cross-sectional view illustrating the color sub-pixel region of FIG. 3A taken along a section line A-A' according to the disclosure. Referring to FIG. 1 to FIG. 3B, the color sub-pixel region 241 may include two continuous sub-pixel regions 240, but the number of the sub-pixel regions 240 included in the color sub-pixel region 241 is not limited thereto. In the embodiment, the color sub-pixel region 241 may include a sub-pixel region 241A (which is also referred to as a first sub-pixel region) and a sub-pixel region 241B (which is also referred to as a second sub-pixel region). In addition, the color sub-pixel region 241 may be provided with color resist units 321 on the substrate 210. In the embodiment, three discontinuous color resist units 321 are provided on the color sub-pixel region 241, but the number of the discontinuous color resist units 321 is not limited thereto. In addition, description of details of the display driving module 110, the electrophoretic display panel 120, the electrophoretic display media 121, and the substrate 210 may be found with reference to the related description of FIG. 1 and thus is not repeated herein.

It should be noted that in FIG. 3B, when incident light L1 irradiates the color sub-pixel region 241, the incident light L1 is reflected to form reflected light L2. Moreover, through the design of the color resist unit 321, the reflected light L2 may display a color corresponding to the color resist unit 321. In addition, based on a driving situation of the electrophoretic display media 121, the color sub-pixel region 241 may display a specific color. For example, a certain color sub-pixel region 241 is provided with a red color resist unit 321. In a normal environment, in a path that the incident light L1 is reflected to form the reflected light L2, if the incident light L1 passes through the red color resist unit 321, the reflected light L2 may present a red color. Similarly, in the path that the incident light L1 is reflected to form the reflected light L2, if the incident light L1 passes through a green color resist unit 321, the reflected light L2 may present a green color. Similarly, in the path that the incident light L1 is reflected to form the reflected light L2, if the incident light L1 passes through a blue color resist unit 321, the reflected light L2 may present a blue color. In this way, through color mixing of the multiple color sub-pixel regions 241, the corresponding pixel regions 230 may present different colors. In this embodiment, the incident light L1 may include ambient light or a light source provided by an electronic product with a light-emitting function, but the disclosure is not limited thereto.

It should be noted that when a plurality of adjacent pixel regions 230 are about to display a white color, arrangement of color resist units of a conventional color filter module may cause a displayed image to have a grainy texture. Especially, this phenomenon will become more obvious when a length or an area of the color resist unit is increased to increase a color saturation or color performance of display. Therefore, in this embodiment, a plurality of discontinuous color resist units 321 are provided on the color sub-pixel region 241 instead of only one continuous color resist unit. Since the plurality of color resist units 321 are arranged in a non-continuous pattern, when a plurality of the adjacent pixel regions 230 are about to display the white color, the phenomenon that the displayed image has the grainy texture may be mitigated. Specifically, since a continuous color block is disassembled into non-continuous patterns, a sense of continuity may be effectively lowered visually, thereby mitigating the phenomenon that the displayed image has the grainy texture caused by the arrangement of the color resist units 221 of the color filter module 200. In this way, the phenomenon of the grainy texture of the white pattern may be mitigated without excessively lowering the color performance of the color image of the electrophoretic display device 100.

Referring back to FIG. 3A, in this embodiment, among the plurality of color sub-pixel regions 241 of the substrate 210, the first sub-pixel region 241A and the second sub-pixel region 241B that correspond to a same color and are adjacent to each other are provided with a plurality of color resist units 321 of the same color of the color resist layer 220, and the plurality of color resist units 321 are arranged in an array and arranged in a non-continuous pattern. For example, the plurality of color resist units 321 disposed on the color sub-pixel region 241 may include three color resist units 321, but the number of the color resist units 321 is not limited by the disclosure. In addition, at least one of the plurality of color resist units 321 (for example, the color resist unit 321 in the middle) crosses over the first sub-pixel region 241A and the second sub-pixel region 241B.

In this embodiment, the plurality of sub-pixel regions 240 are arranged in an array in the first direction D1 and the second direction D2. In addition, a symmetry axis AOS of each of the color resist units 321 may extend in a fourth direction D4. The first direction D1 is perpendicular to the second direction D2. An included angle between the fourth direction D4 and the first direction D1 may be less than 90 degrees. In addition, in this embodiment, figures of the plurality of color resist units 321 are different from shapes of the plurality of sub-pixel regions 241A and 241B. For example, the figures of the plurality of color resist units 321 may be rectangles with different lengths and widths, and the shapes of the plurality of sub-pixel regions 241A and 241B may be squares. However, the shapes, the number, and the arrangement of the color resist units 321 may be changed according to an actual design, and are not intended to limit the disclosure.

It should be noted that when the plurality of color resist units 321 are arranged, a ratio of a total color resist area of the plurality of color resist units 321 to a total sub-pixel area of the first sub-pixel region 241A and the second sub-pixel region 241B may be less than 80%, so as to effectively achieve the effect of mitigating the phenomenon of grainy texture of the white pattern. More preferably, the ratio may be less than 60% to obtain a better improvement effect. The ratio is related to the color performance and color saturation of the display image, and an appropriate value thereof may be selected according to the actual design.

Figure 4:
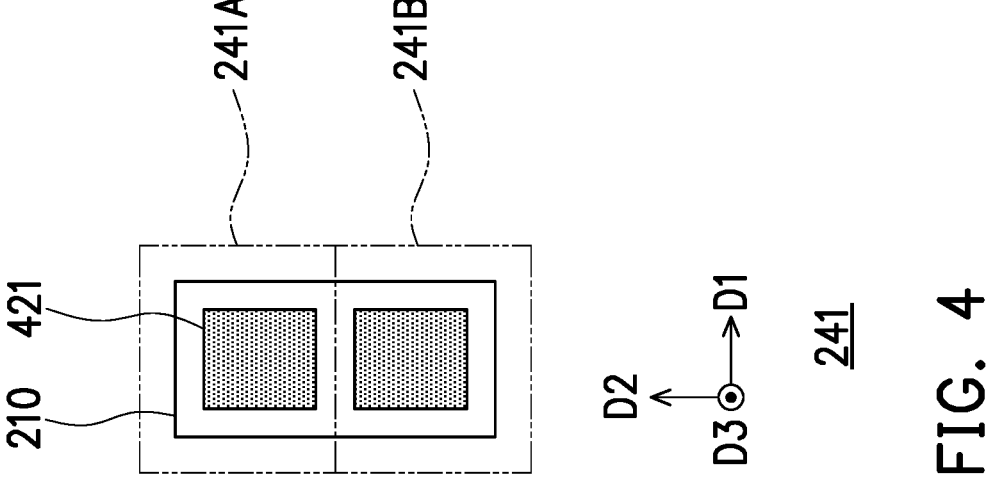
FIG. 4 is a top view illustrating the color sub-pixel region according to an embodiment of the disclosure.

FIG. 4 is a top view illustrating the color sub-pixel region according to an embodiment of the disclosure. In this embodiment, the color sub-pixel region 241 is provided with two sub-pixel regions 240, but the number of the sub-pixel regions 240 included in the color sub-pixel region 241 is not limited thereto. In this embodiment, the color sub-pixel region 241 may include a sub-pixel region 241A (which is also referred to as a first sub-pixel region) and a sub-pixel region 241B (which is also referred to as a second sub-pixel region). In this embodiment, the plurality of color resist units 421 include an upper color resist unit 421 (which is also referred to as a first color resist unit) and a lower color resist unit 421 (which is also referred to as a second color resist unit), and the first color resist unit and the second color resist unit are separately disposed in the first sub-pixel region 241A and the second sub-pixel region 241B. In other words, the color sub-pixel region 241 is provided with two discontinuous color resist units 421. Moreover, a discontinuous color resist unit 421 is respectively disposed on the first sub-pixel region 241A and the second sub-pixel region 241B. In other words, in this embodiment, only one color resist unit 421 is disposed on one sub-pixel region 240. In addition, in this embodiment, the figures of the plurality of color resist units 421 are the same as the shapes of the plurality of sub-pixel regions 241A, 241B, and the shapes of both are squares. In addition, a cross-sectional view of the color sub-pixel region 241 of FIG. 4 is similar to that of FIG. 2B, and detail thereof is not repeated. In this embodiment, since the continuous color block is disassembled into non-continuous patterns, the sense of continuity may be effectively lowered visually, thereby mitigating the phenomenon that the displayed image has the grainy texture caused by the arrangement of the color resist units 221 of the color filter module 200. In this way, the phenomenon of the grainy texture of the white pattern may be mitigated without excessively reducing the color performance of the color image of the electrophoretic display device 100.

Figure 5:
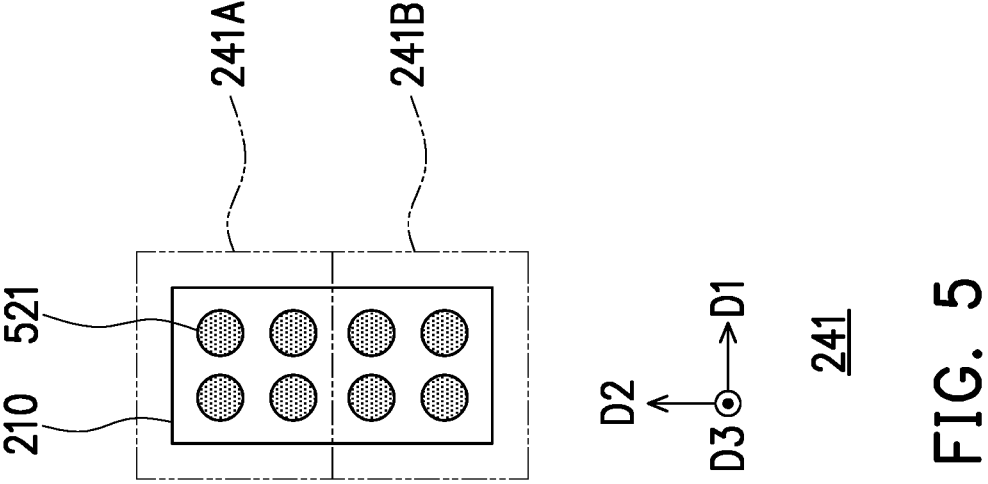
FIG. 5 is a top view illustrating the color sub-pixel region according to an embodiment of the disclosure.

FIG. 5 is a top view illustrating the color sub-pixel region according to an embodiment of the disclosure. Referring to FIG. 5, in this embodiment, a plurality of color resist units 521 includes a plurality of color resist units 521 (which are also referred to as first color resist units) of an upper half part and a plurality of color resist units 521 (which are also referred to as second color resistance unit) of a lower half part. For example, the plurality of color resist units 521 includes four first color resist units and four second color resist units, but the number of the color resist units 521 is not limited by the disclosure. Moreover, the plurality of first color resist units 521 and the plurality of second color resist units 521 are respectively arranged regularly in the first sub-pixel region 241A and the second sub-pixel region 241B. For example, in this embodiment, the four first color resist units 521 and the four second color resist units 521 may be respectively arranged in the first sub-pixel region 241A and the second sub-pixel region 241B in a manner of a 2×2 matrix, but the disclosure is not limited thereto. In this embodiment, the figures of the plurality of color resist units 521 may be circles. In addition, a cross-sectional view of the color sub-pixel region 241 in FIG. 5 is similar to that in FIG. 2B, and detail thereof is not repeated. In this embodiment, since the continuous color block is disassembled into non-continuous patterns, the sense of continuity may be effectively lowered visually, thereby mitigating the phenomenon that the displayed image has the grainy texture caused by the arrangement of the color resist units 221 of the color filter module 200. In this way, the phenomenon of the grainy texture of the white pattern may be mitigated without excessively lowering the color performance of the color image of the electrophoretic display device 100.

It should be noted that the shapes and numbers of the color resist units shown in FIG. 2 to FIG. 5 are only for illustration, and the shapes and the number of the color resist units may be changed according to the actual design, and are not used to limit the disclosure.

In view of the foregoing, in the color filter module 200 of the disclosure, since the continuous color block is disassembled into non-continuous patterns, the sense of continuity may be effectively lowered visually, thereby mitigating the phenomenon that the displayed image has the grainy texture caused by the arrangement of the color resist units 221 of the color filter module 200. In this way, the phenomenon of the grainy texture of the white pattern may be mitigated without excessively lowering the color performance of the color image of the electrophoretic display device 100.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A color filter module, disposed on an electrophoretic display panel, comprising:

a substrate, comprising a plurality of pixel regions arranged in an array, each of the plurality of pixel regions comprising a plurality of sub-pixel regions; and a color resist layer, disposed on the substrate, wherein among the plurality of sub-pixel regions of the substrate, a first sub-pixel region and a second sub-pixel region that correspond to a same color and are adjacent to each other are provided with a plurality of color resist units of the same color of the color resist layer, and the plurality of color resist units are arranged in an array and arranged in a discontinuous pattern, wherein the plurality of color resist units has a rectangular shape,

wherein at least one of the plurality of color resist units crosses over the first sub-pixel region and the second sub-pixel region, wherein the plurality of sub-pixel regions are arranged in an array in a first direction and a second direction, and a plurality of symmetry axes of all of the plurality of color resist units extend along same third direction, wherein the first direction is perpendicular to the second direction, and an included angle between the third direction and the first direction is less than 90 degrees, and wherein a ratio of a total color resist area of the plurality of color resist units to a total sub-pixel area of the first sub-pixel region and the second sub-pixel region is less than 60%.

2. The color filter module according to claim 1, wherein the plurality of color resist units comprise a first color resist unit and a second color resist unit, and the first color resist unit and the second color resist unit are separately disposed in the first sub-pixel region and the second sub-pixel region.

3. The color filter module according to claim 1, wherein the plurality of color resist units comprise a plurality of first color resist units and a plurality of second color resist units, and the plurality of first color resist units and the plurality of second color resist units are respectively arranged regularly in the first sub-pixel region and the second sub-pixel region.

4. The color filter module according to claim 1, wherein shapes of the plurality of color resist units are different from shapes of the plurality of sub-pixel regions.

5. The color filter module according to claim 1, wherein figures of the plurality of color resist units are circles.

6. The color filter module according to claim 1, wherein the electrophoretic display panel is a reflective electrophoretic display panel.

* * * * *